United States Patent
Lee et al.

(10) Patent No.: US 8,902,807 B2
(45) Date of Patent: Dec. 2, 2014

(54) RELAY SYSTEM BASED ON RESOURCE ALLOCATION

(75) Inventors: Heesoo Lee, Daejeon (KR); Jae Young Ahn, Daejeon (KR); Taegyun Noh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 13/201,121

(22) PCT Filed: Feb. 12, 2010

(86) PCT No.: PCT/KR2010/000913
§ 371 (c)(1),
(2), (4) Date: Aug. 11, 2011

(87) PCT Pub. No.: WO2010/093202
PCT Pub. Date: Aug. 19, 2010

(65) Prior Publication Data
US 2011/0310792 A1 Dec. 22, 2011

(30) Foreign Application Priority Data

Feb. 13, 2009 (KR) .................. 10-2009-0012135
Feb. 16, 2009 (KR) .................. 10-2009-0012580

(51) Int. Cl.
*H04B 7/185* (2006.01)
*H04W 72/04* (2009.01)
*H04L 5/00* (2006.01)
*H04B 7/155* (2006.01)
*H04W 84/04* (2009.01)

(52) U.S. Cl.
CPC ....... *H04B 7/15542* (2013.01); *H04W 72/0493* (2013.01); *H04W 84/047* (2013.01); *H04L 5/001* (2013.01)

USPC ........................................... 370/316; 370/328

(58) Field of Classification Search
CPC ..... H04W 16/16; H04W 16/14; H04W 48/16; H04W 84/047; H04L 1/0026
See application file for complete search history.

(56) References Cited

U.S. PATENT DOCUMENTS

| | | | |
|---|---|---|---|
| 2009/0201846 A1* | 8/2009 | Horn et al. | 370/315 |
| 2010/0080166 A1* | 4/2010 | Palanki et al. | 370/315 |
| 2010/0304665 A1* | 12/2010 | Higuchi | 455/7 |
| 2011/0222428 A1* | 9/2011 | Charbit et al. | 370/252 |

FOREIGN PATENT DOCUMENTS

| | | |
|---|---|---|
| KR | 1020070031173 | 3/2007 |
| KR | 1020070035869 | 4/2007 |
| KR | 1020070042224 | 4/2007 |
| KR | 1020080017629 | 2/2008 |
| KR | 1020080038967 | 5/2008 |

OTHER PUBLICATIONS

International Search Report for Application No. PCT/KR2010/000913, dated Sep. 29, 2010.

* cited by examiner

*Primary Examiner* — Jung Park
(74) *Attorney, Agent, or Firm* — Nelson Mullins Riley & Scarborough LLP; Anthony A. Laurentano, Esq.; Dipti Ramnarain, Esq.

(57) ABSTRACT

A communication system which transmits data using a relay is disclosed. The communication system efficiently divides and allocates wireless resources allocated to a data transmission system to reception and transmission links between a base station and a relay, reception and transmission links between the base station and a terminal, and reception and transmission links between the relay and the terminal.

20 Claims, 12 Drawing Sheets

FIG. 2
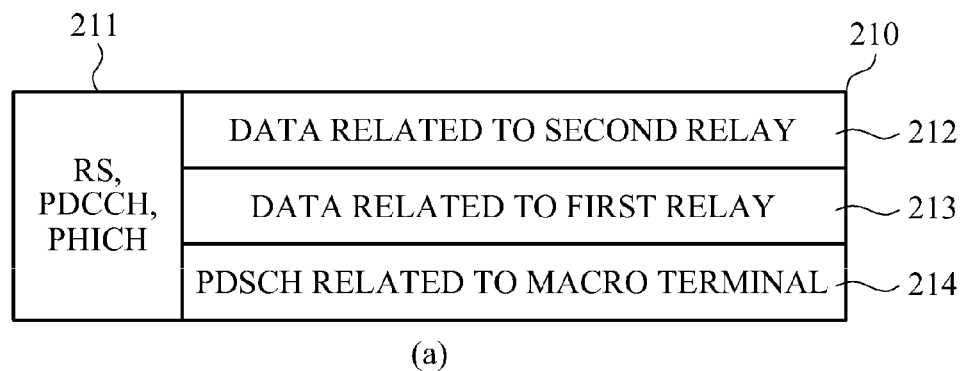
(a)
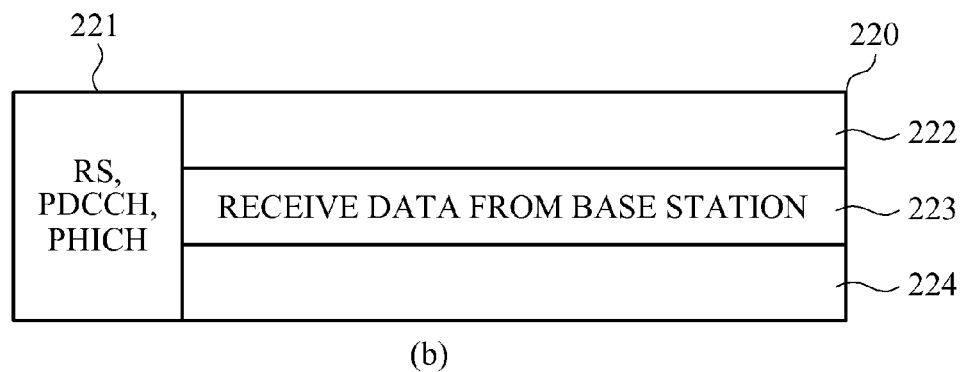
(b)

FIG. 3
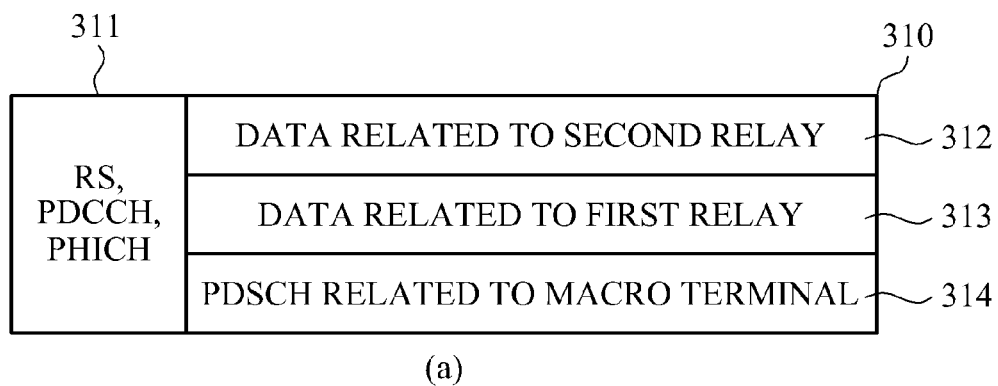
(a)
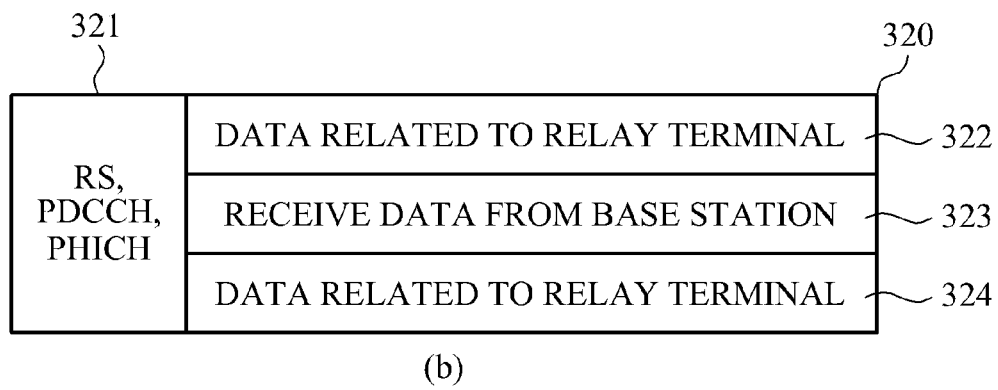
(b)

RELAY SYSTEM BASED ON RESOURCE ALLOCATION

RELATED APPLICATIONS

This application is a 35 U.S.C. §371 national stage filing of PCT Application No. PCT/KR2010/000913 filed on Feb. 12, 2010, which claims priority to, and the benefit of, Korean Patent Application No. 10-2009-0012135 filed Feb. 13, 2009, and Korean Patent Application No. 10-2009-0012580 filed Feb. 16, 2009. The contents of the aforementioned applications are hereby incorporated by reference.

TECHNICAL FIELD

The present invention relates to a mobile communication, and more particularly, to a communication system which transmits data using a relay.

BACKGROUND ART

FIG. 1 illustrates a view showing links in a data transmission system using relays. The data transmission system includes a base station 110, relays 120 and 150, a macro terminal 130, and a relay terminal 140. The macro terminal transmits or receives data to or from the base station 110 through direct connection with the base station 110. The relay terminal directly connects with the relay 120.

The relay terminal 140 transmits data to the relay 120. The relay 120 forwards the received data to the base station 110. In addition, the base station 110 transmits the data to the relay 120 and, accordingly, the relay 120 transmits the received data to the relay terminal 140.

The base station 110, the relays 120 and 150, and the terminals 130 and 140 may transmit and receive data using a wireless resource. Depending on embodiments, a frequency range, a time slot, and the like may be used as the wireless resource.

The data transmission system properly allocates the wireless resources to uplinks and downlinks between the base station 110 and the relay 120, uplinks and downlinks between the relay 120 and the relay terminal 140, and uplinks and downlinks between the base station 110 and the macro terminal 130. The data transmission system transmits data using the allocated wireless resources.

FIG. 2 illustrates a drawing showing the structure of a data frame in a case where data transmission is performed by dividing frequency resources.

Part (a) of FIG. 2 shows the structure of the data frame that a base station transmits to a relay. The data frame 210 may include a control signal region 211, and data regions 212, 213, and 214.

A horizontal axis of the data frame denotes elapse of time while a vertical axis denotes a frequency range.

The control signal region 211 may transmit control signals corresponding to a reference signal (RS), a physical control format indicator channel (PCFICH), a physical downlink control channel (PDCCH), and a Physical H-ARQ Indicator Channel (PHICH). The control signal region 211 may include information on the data regions or wireless resources corresponding to the data regions. For example, the control signal region 211 may include information on a starting point and an ending point of each region, and information on a transmission frequency range of each region.

The data regions 212, 213, and 214 may include data regions 212 and 213 in which data is transmitted to a plurality of relays and a data region 214 in which data is transmitted to a macro terminal. In the data region 214, transmission of the data to the macro terminal may be performed using a physical downlink shared channel (PDSCH).

Part (b) of FIG. 2 illustrates a view showing the operation of a first relay with respect to each region of the data frame shown in part (a) of FIG. 2. In a region 221, the first relay transmits control signals for relay terminals.

In a region 223, the first relay receives data with respect to the first relay.

According to the embodiments of FIG. 2, the first relay performs no operation regarding the wireless resource for transmission of data related to a second relay and data related to the macro terminal in data regions 222 and 224, respectively. Thus, a waste of the wireless resource is induced.

DISCLOSURE OF INVENTION

Technical Goals

An aspect of the present invention provides a data transmission system efficiently dividing and allocating wireless resources thereof to reception and transmission links between a base station and a relay, reception and transmission links between the base station and a terminal, and reception and transmission links between the relay and the terminal.

Technical Solutions

According to an aspect of the present invention, there is provided a relay including a receiving unit to receive first data from a base station using a first wireless resource; and a transmitting unit to transmit second data to a first terminal using a second wireless resource.

According to an aspect of the present invention, there is provided a terminal including a receiving unit to receive first data received by a relay from a base station using a first wireless resource, from the relay using a second wireless resource, wherein the base station transmits second data to a second terminal using the second wireless resource.

According to an aspect of the present invention, there is provided a relay including a transmitting unit to transmit first data to a base station using a first wireless resource; and a receiving unit to receive second data from a first terminal using a second wireless resource.

According to an aspect of the present invention, there is provided a base station including a receiving unit to receive first data from a relay using a first wireless resource and second data from a first terminal using a second wireless resource, wherein the relay receives third data from a second terminal using the second wireless resource.

According to the above embodiments, wireless resources may be effectively allocated to transmission and reception links between the base station and the relay, transmission and reception links between the base station and the terminal, and transmission and reception links between the relay and the terminal.

BRIEF DESCRIPTION OF DRAWINGS

FIG. 2 is a view showing the structure of a data frame in a case where data transmission is performed by dividing frequency resources;

FIG. 3 is a view showing the structure of a data frame to which a wireless resource is allocated, according to an embodiment of the present invention;

BEST MODE FOR CARRYING OUT THE INVENTION

Figure 1:
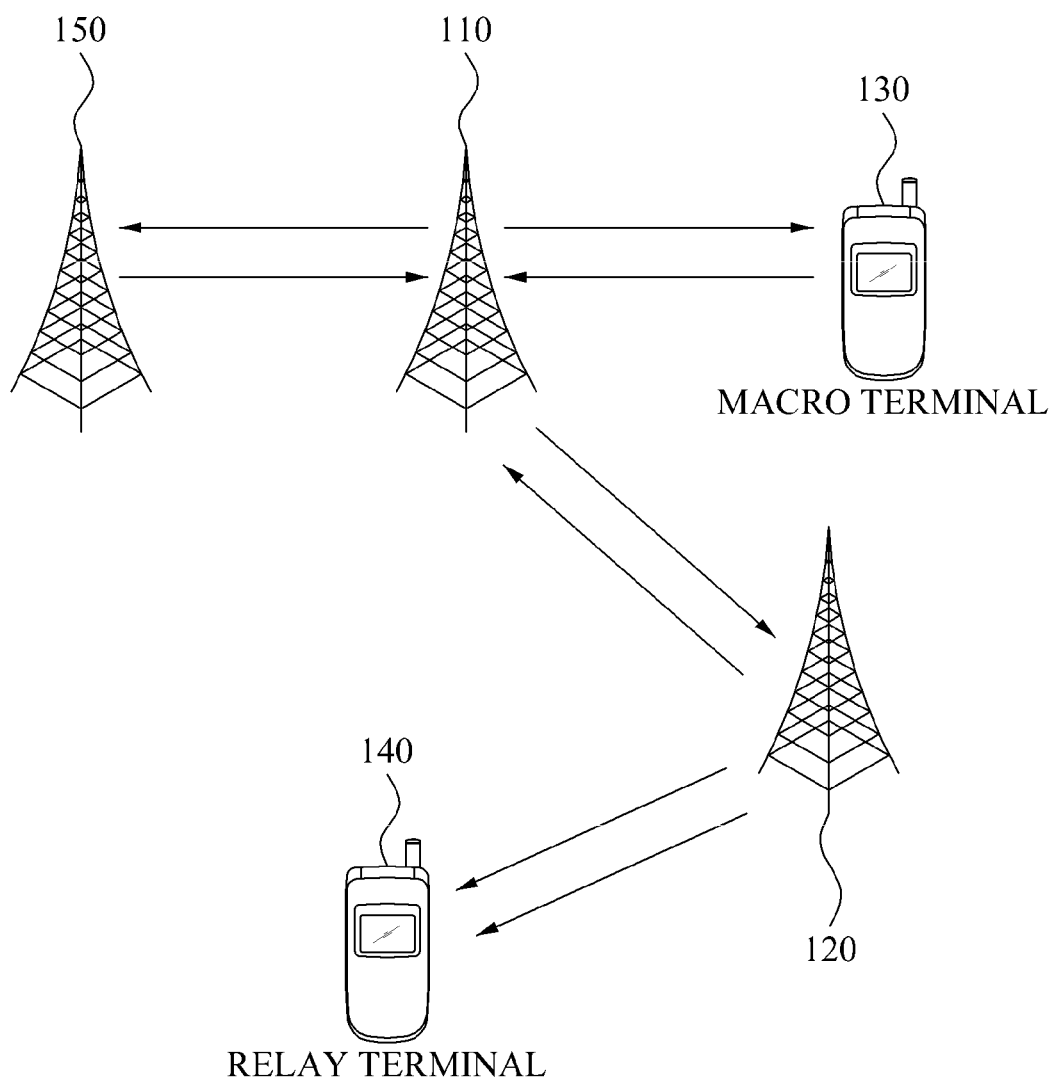
FIG. 1 is a view showing links in a data transmission system using relays.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 3 shows the structure of a data frame to which a wireless resource is allocated, according to an embodiment of the present invention.

Part (a) of FIG. 3 shows the structure of the data frame transmitted to a relay by a base station. Since part (a) of FIG. 3 is similar to part (a) of FIG. 2, a detailed description thereof will be omitted.

Hereinafter, a first wireless resource refers to a wireless resource used for the base station to transmit data 313 related to a first relay. A second wireless resource refers to a wireless resource used for the base station to transmit data 312 related to a second relay. A third wireless resource refers to a wireless resource used for the base station to transmit data 314 related to a macro terminal.

Part (b) of FIG. 3 shows operations of the first relay in each region of the data frame shown in part (a) of FIG. 3. The first relay receives data 323 related to the first relay. In other words, the first relay receives data using the first wireless resource.

The first relay transmits data related to a relay terminal to the relay terminal using a second wireless resource 322 and a third wireless resource 324. Specifically, the first relay may transmit and receive data using all wireless resources allocated to the data transmission system. Therefore, waste of unused wireless resources may be minimized, that is, the wireless resources may be efficiently used. Additionally, the efficiency of the data transmission system increases.

Although only the frequency range is illustrated as an example wireless resource in FIG. 3, a time slot may also be used as the wireless resource according to another embodiment. In this case, the embodiment of the present invention may be applied in a similar manner with respect to the time slot.

Figure 4:
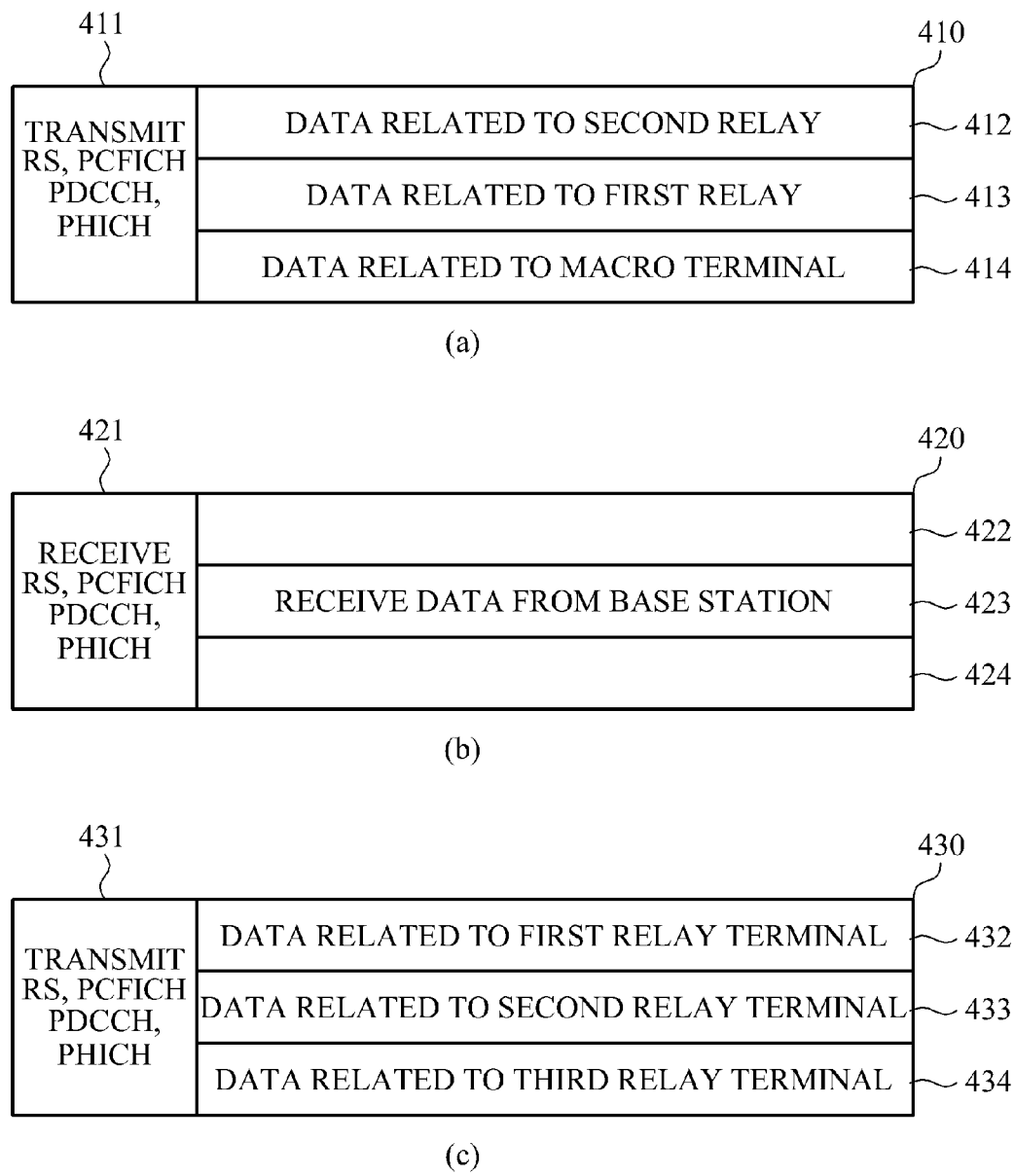
FIG. 4 is a view showing the structure of a downlink data frame to which the wireless resource is allocated, according to an embodiment.

FIG. 4 shows the structure of a downlink data frame to which the wireless resource is allocated, according to an embodiment of the present invention.

Part (a) of FIG. 4 shows the structure of a downlink data frame 410 transmitted by a base station to a relay. The downlink data frame 410 transmitted by the base station to the relay includes a control signal region 411 and data regions 412, 413, and 414.

The base station transmits control signals using the control signal region 411, the control signals such as a reference signal (RS), a physical control format indicator channel (PCFICH), a physical downlink control channel (PDCCH), and a Physical H-ARQ Indicator Channel (PHICH), to the macro terminal and the relay which receive data directly from the base station.

The base station transmits data related to the second relay, data related to the first relay, and data related to the macro terminal using the data regions 412, 413, and 414, respectively.

Part (b) of FIG. 4 shows the structure of a downlink data frame 420 received by the first relay from the base station. The downlink data frame 420 received by the first relay from the base station includes a control signal region 421 and data regions 422, 423, and 424.

The first relay receives control signals such as an RS, a PCFICH, a PDCCH, and a PHICH from the base station using the control signal region 421. The first relay receives data from the base station using the data region 423, that is, a wireless resource region 423. The wireless resource region 423 is used for the first relay to receive data from the base station and corresponds to the data region 413 which is a wireless resource region in which the base station transmits data to the first relay.

According to the embodiment of the present invention, the relay may transmit and receive data using a plurality of frequency allocations (FAs) or a plurality of component carriers. Here, the FAs or component carriers used for the relay to receive data from the base station may be different from FAs or component carriers used for the relay to transmit data to the relay terminal.

Part (c) of FIG. 4 shows the structure of the downlink data frame transmitted by the relay to the relay terminal in the case where the FAs or component carriers used for the relay to receive data from the base station are different from FAs or component carriers used for the relay to transmit data to the relay terminal. The downlink data frame shown in part (c) of FIG. 4 uses FAs or component carriers different from those shown in part (b) of FIG. 4. In other words, the wireless resources of the downlink data frame shown in part (c) of FIG. 4 do not correspond to the wireless resources shown in parts (a) and (b) of FIG. 4.

The downlink data frame 430 used for the relay to transmit data to the relay terminal includes a control signal region 431 and data regions 432, 433, and 434.

The relay transmits the control signals such as the RS, the PCFICH, the PDCCH, and the PHICH to the relay terminal using the control signal region 431.

The relay may transmit data to a first relay terminal, a second relay terminal, and a third relay terminal using the data regions 432, 433, and 434, respectively.

In the embodiment shown in FIG. 4, the relay receives or transmits data using a plurality of FAs or a plurality of component carriers. In this case, the relay may discriminate between a frequency range for reception of the data and a carrier component for transmission of the data as shown in FIG. 4.

According to an embodiment of the present invention, the relay may receive or transmit data using a single FA or a single component carrier. In this case, the relay may transmit data to the relay terminal or receive data from the base station by dividing the wireless resources in the single component carrier.

Figure 5:
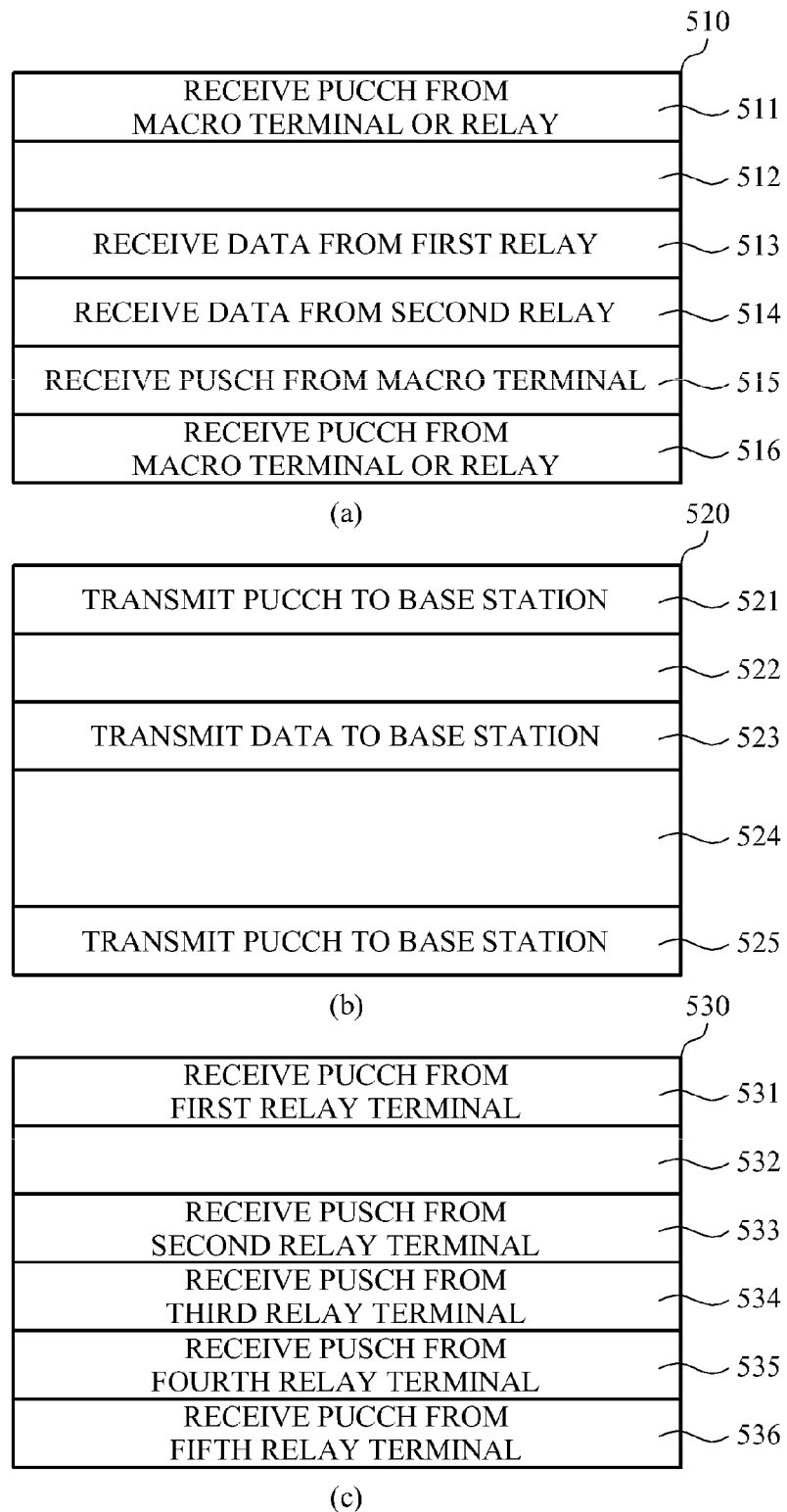
FIG. 5 is a view showing the structure of an uplink data frame to which the wireless resource is allocated, according to an embodiment.

FIG. 5 shows the structure of an uplink data frame to which a wireless resource is allocated, according to an embodiment of the present invention.

Part (a) of FIG. 5 shows the structure of the uplink data frame for data reception of the base station from the relay or the macro terminal.

The base station may receive a physical uplink control channel (PUCCH) from the macro terminal or the relay using a first wireless resource 511.

The base station performs no operation with respect to a second wireless resource 512.

The base station may receive data from the first relay using a third wireless resource 513 and data from the second relay using a fourth wireless resource 514. The data received by the base station may include a shared channel (SC) and control information (CI).

The base station may receive a physical uplink shared channel (PUSCH) from the macro terminal using a fifth wireless resource 515.

The base station may receive the PUCCH from the macro terminal or the relay using a sixth wireless resource 516.

Part (b) of FIG. 5 shows the structure of the data frame for data transmission of the first relay to the base station in a case where the base station operates as illustrated in part (a) of FIG. 5.

The first relay transmits the PUCCH to the base station using a first wireless resource 521 and a sixth wireless resource 525. In addition, the first relay transmits data to the base station using a third wireless resource 523. The first wireless resource 521, the third wireless resource 523, and the sixth wireless resource 525 of part (b) of FIG. 5 correspond to the first wireless resource 511, the third wireless resource 513, and the sixth wireless resource 516 of part (a) of FIG. 5, respectively.

According to the embodiment of the present invention, the relay may transmit and receive data using a plurality of FAs or a plurality of component carriers. In this case, FAs or component carriers used for the relay to transmit data to the base station may be different from FAs or component carriers used for the relay to receive data from the relay terminal.

Part (c) of FIG. 5 shows the structure of the uplink data frame for data reception of the relay from the relay terminal in a case where the FAs or component carriers used for the relay to transmit data to the base station are different from the FAs or component carriers used for the relay to receive data from the relay terminal. The uplink data frame shown in part (c) of FIG. 5 uses different FAs or component carriers from the data frame shown in part (b) of FIG. 5. In other words, the wireless resources of the downlink data frame shown in part (c) of FIG. 4 do not correspond to the wireless resources shown in parts (a) and (b) of FIG. 4.

The relay receives the PUCCH from the first relay terminal using a first wireless resource 531 and receives the PUCCH from the second relay terminal using a third wireless resource 533. Additionally, the relay receives the PUCCH from the third relay terminal using a fourth wireless resource 534, from a fourth relay terminal using a fifth wireless resource 535, and from a fifth relay terminal using a sixth wireless resource 536.

FIG. 5 shows the example embodiment in which the relay receives or transmits data using a plurality of the FAs or component carriers. In this case, the relay may discriminate between FAs or component carriers for reception of data and FAs or component carriers for transmission of data.

According to an embodiment of the present invention, the relay may receive and transmit data using a single FA or component carrier. In this case, the relay may receive data from the relay terminal or transmit data to the base station by dividing a wireless frequency resource in the single FA or component carrier.

Figure 6:
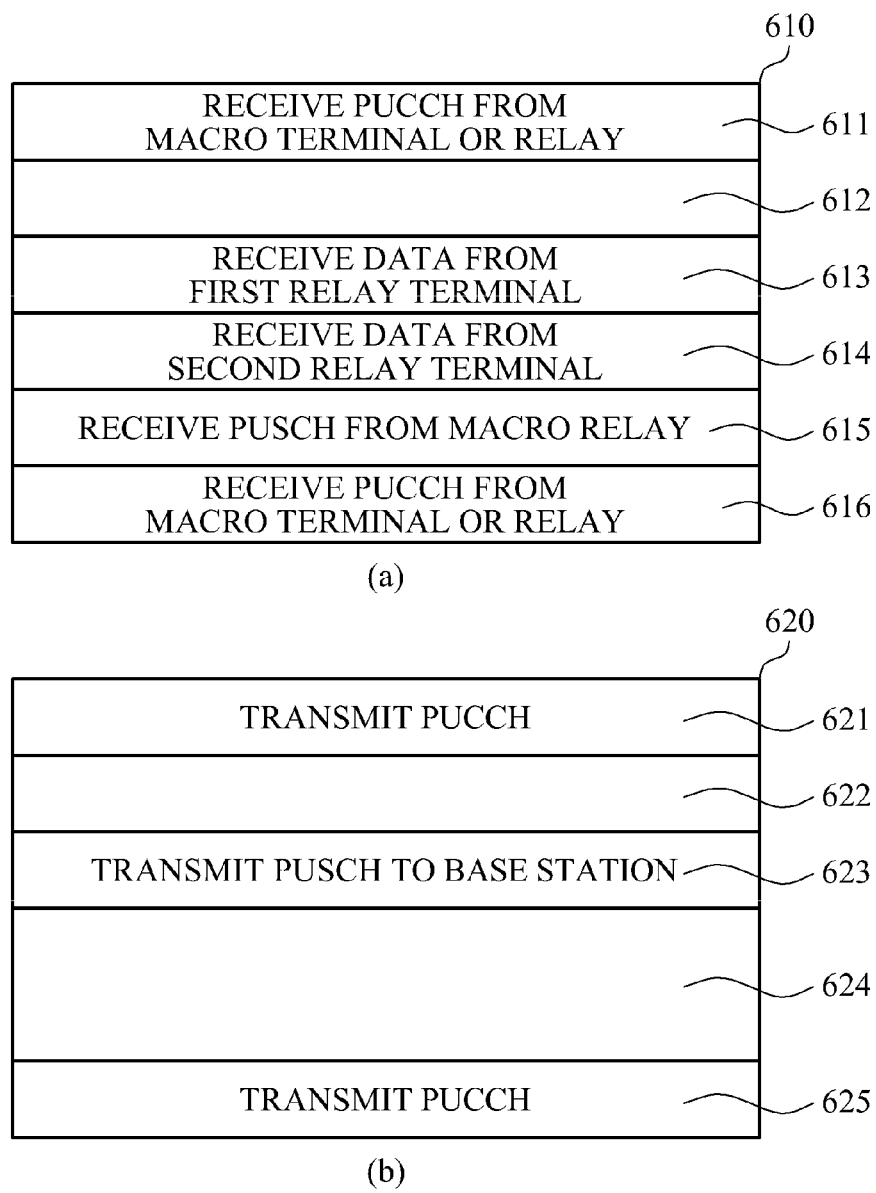
FIG. 6 is a view showing the structure of a data frame to which a wireless resource is allocated, according to an embodiment.

FIG. 6 shows the operation of the base station and the relay with respect to the respective wireless resources in a case where the base station receives data from the relay or the macro terminal, according to an embodiment of the present invention.

Part (a) of FIG. 6 shows the operation of the base station.

The base station receives the PUCCH from the macro terminal or the relays using a first wireless resource 611.

The base station performs no operation with respect to a second wireless resource 612.

The base station receives data from the first relay using a third wireless resource 613 from the first relay and receives data from the second relay using a fourth wireless resource 614.

The base station receives the PUSCH from the macro terminal using a fifth wireless resource 615.

The base station receives the PUCCH from the macro terminal and the relays using a sixth wireless resource 616.

Part (b) of FIG. 6 shows the operation of the first relay in a case where the base station operates as illustrated in part (a) of FIG. 6.

The first relay transmits the PUCCH to the base station using a first wireless resource 621 and a sixth wireless resource 625.

The first relay transmits data to the base station using a fourth wireless resource 623 while performing no operation with respect to a second wireless resource and a third wireless resource 622, and a fifth wireless resource 624.

According to the embodiment shown in FIGS. 5 and 6, there may be wireless resources with respect to which the first relay does not perform any operation, that is, unused wireless resources. To efficiently use of such wasted wireless resources, the relay may allocate unused wireless resources to receive data from the relay terminal. For example, when the relay transmits data to the base station using only a part of resources of the uplink, the relay may receive other data from the relay terminal using other wireless resources.

Figure 7:
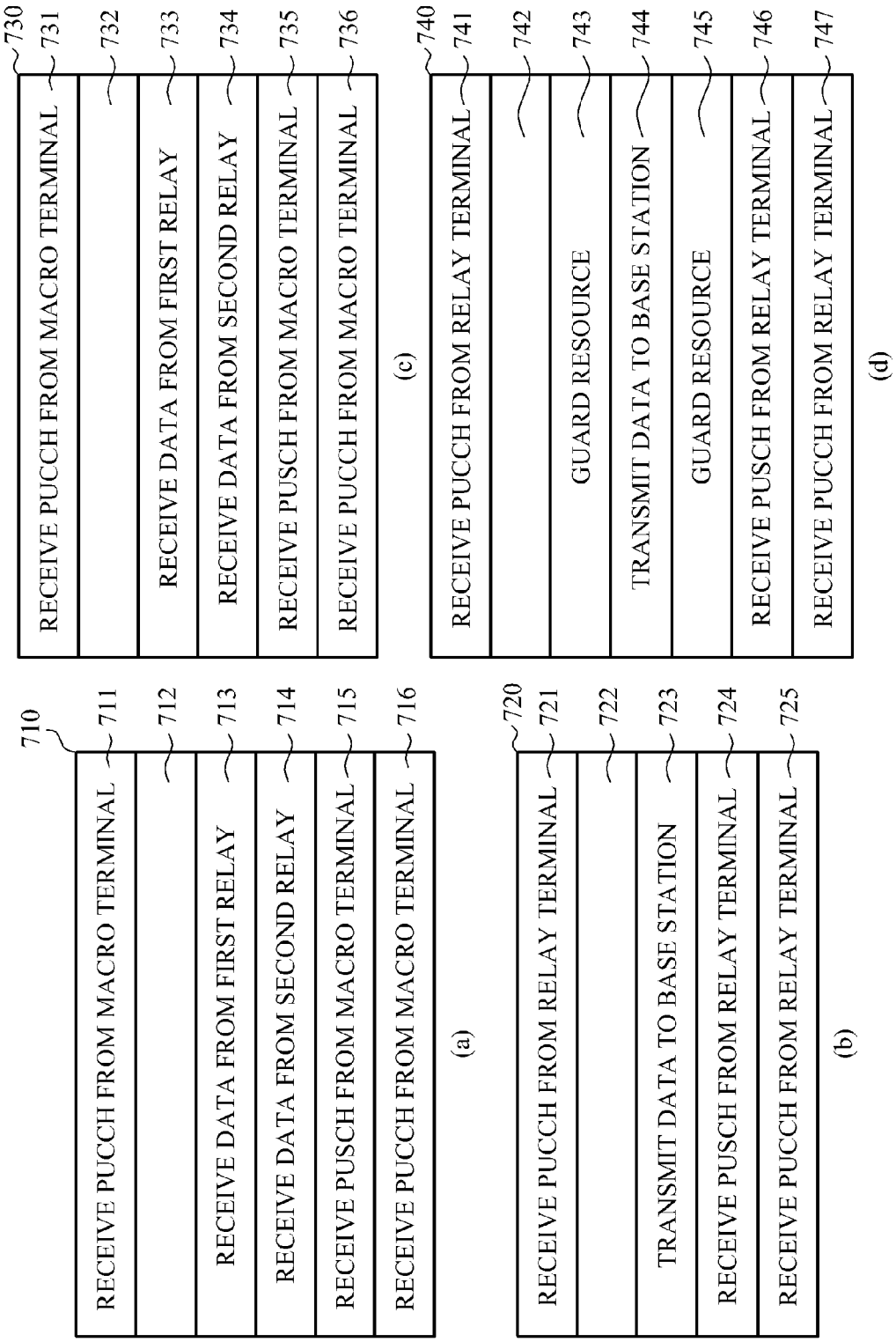
FIG. 7 is a view showing the structure of a data frame to which a wireless resource is allocated, according to another embodiment.

FIG. 7 shows the operation of the base station and the relay with respect to the respective wireless resources in a case where the base station receives data from the relay or the macro terminal, according to another embodiment of the present invention.

Part (a) of FIG. 7 shows the operation of the base station.

The base station receives the PUCCH from the macro terminal using a first wireless resource 711.

The base station performs no operation with respect to a second wireless resource 712.

The base station receives data from the first relay using a third wireless resource 713 and receives data from the second relay using a fourth wireless resource 714.

In addition, the base station receives the PUSCH from the macro terminal using a fifth wireless resource 715 and receives the PUCCH from the macro terminal using a sixth wireless resource 716.

Part (b) of FIG. 7 shows the operation of the first relay in a case where the base station operates as illustrated in part (a) of FIG. 7.

The first relay receives the PUCCH from the relay terminal using a first wireless resource 721.

The first relay performs no operation with respect to a second wireless resource 722.

The first relay transmits data to the base station using a third wireless resource 723.

The first relay receives the PUSCH from the relay terminal using a fourth wireless resource and a fifth wireless resource 724, and receives the PUCCH from the relay terminal using a sixth wireless resource 725.

Part (c) of FIG. 7 shows the operation of the base station.

The base station receives the PUCCH from the macro terminal using a first wireless resource 731.

The base station performs no operation with respect to a second wireless resource 732.

The base station receives data from the first relay using a third wireless resource 733 and receives data from the second relay using a fourth wireless resource 734. The data received by the base station may include SCH or CI.

The base station receives the PUSCH from the macro terminal using a fifth wireless resource 755 and receives the PUCCH from the macro terminal using a sixth wireless resource 756.

Part (d) of FIG. 7 shows the operation of the first relay in a case where the base station operates as illustrated in part (c) of FIG. 7.

The first relay receives the PUCCH from the relay terminal using a first wireless resource 741.

The first relay performs no operation with respect to a second wireless resource 742.

The first relay transmits data to the base station using a third wireless resource 744.

The first relay receives the PUSCH from the relay terminal using a fourth wireless resource and a fifth wireless resource 746, and receives the PUCCH from the relay terminal using a sixth wireless resource 747.

Guard resources may be provided between the wireless resources 741, 746, and 747 which receive the PUCCH or PUSCH from the relay terminal and the wireless resource 744 which transmits the data to the base station to minimize magnetic interference.

Figure 8:
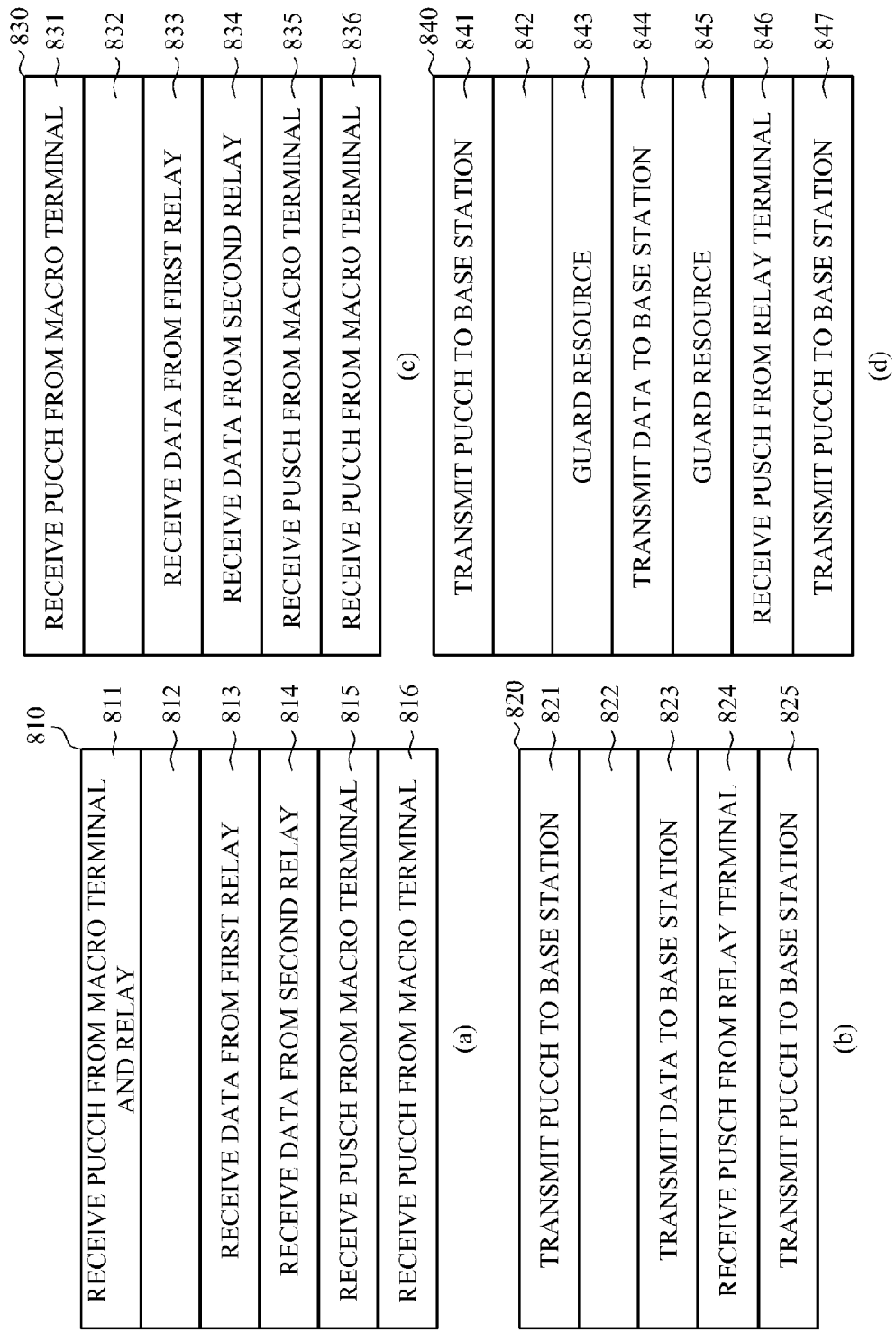
FIG. 8 is a view showing the structure of a data frame to which a wireless resource is allocated, according to still another embodiment.

FIG. 8 shows the operation of the base station and the relay with respect to the respective wireless resources in a case where the base station receives data from the relay or the macro terminal, according to still another embodiment of the present invention.

Whereas the wireless resources 721, 725, 741, and 747 that receive the PUCCH from the relay terminal are allocated at both ends of the uplink range in the embodiment of FIG. 7, wireless resources 821, 825, 841, and 847 used for the relay to transmit the PUCCH to the base station are allocated at both ends.

A description of other wireless resources will be omitted since the base station and the relay operate in the similar manner as in the embodiment of FIG. 7.

Figure 9:
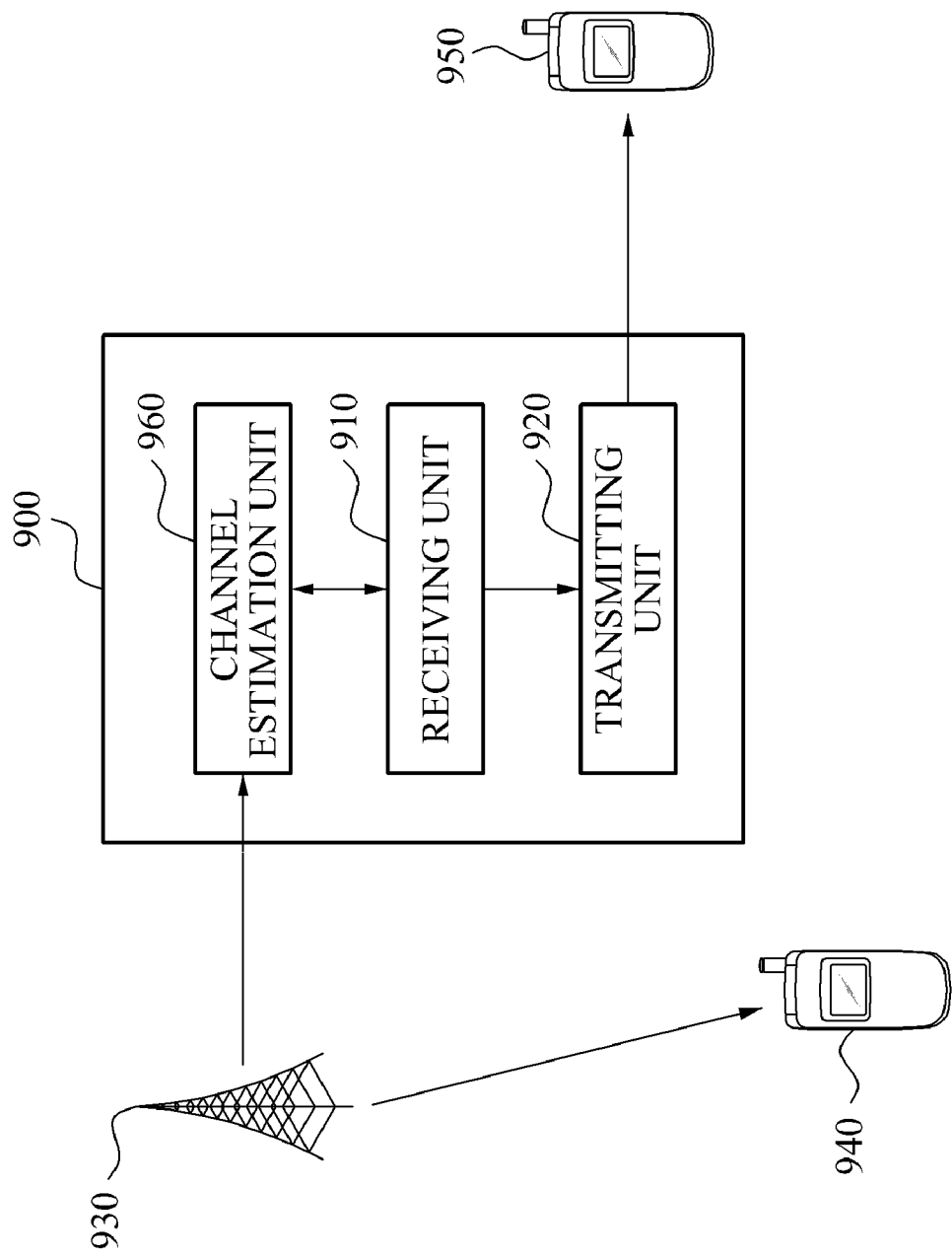
FIG. 9 is a view showing the structure of a relay according to an embodiment.

FIG. 9 shows the structure of a relay according to an embodiment of the present invention.

A relay 900 includes a receiving unit 910 and a transmitting unit 920.

The receiving unit 910 receives first data from a base station 930 using a first wireless resource. The wireless resource may include at least one of a time slot and a frequency range.

The transmitting unit 920 transmits second data to a relay terminal 950 using a second wireless resource.

According to the embodiment, the receiving unit 910 may receive information on the first wireless resource or the second wireless resource and receive the first data based on the information on the wireless resource. The information on the wireless resource may include information on a starting point of the wireless resource, information on an ending point of the wireless resource, and information on frequency ranges of the wireless resources.

The base station 930 may transmit third data from a macro terminal 940 using the second wireless resource.

According to the embodiment, the first wireless resource and the second wireless resource may be adjacent to each other. For example, if the wireless resources are the time slot, the first wireless resource and the second wireless resource may be wireless resources temporally adjacent to each other. If the wireless resources are frequency ranges, the first wireless resource and the second wireless resource may be frequency ranges adjacent to each other. The relay may receive data of a downlink using the first wireless resource and transmit data of an uplink using the second wireless resource. When the wireless resources allocated to the uplink and the downlink are adjacent to each other, data transmission efficiency may reduce due to magnetic interference. To this end, guard resources may be provided between the first wireless resource and the second wireless resource to prevent the reduction of the data transmission efficiency.

The relay shown in FIG. 9 receives the first data from the base station using only a part of the wireless resource of the downlink and transmits the second data to the terminal using other wireless resources. According to this, waste of the wireless resource may be minimized while the data transmission efficiency of the data transmission system increases.

Figure 10:
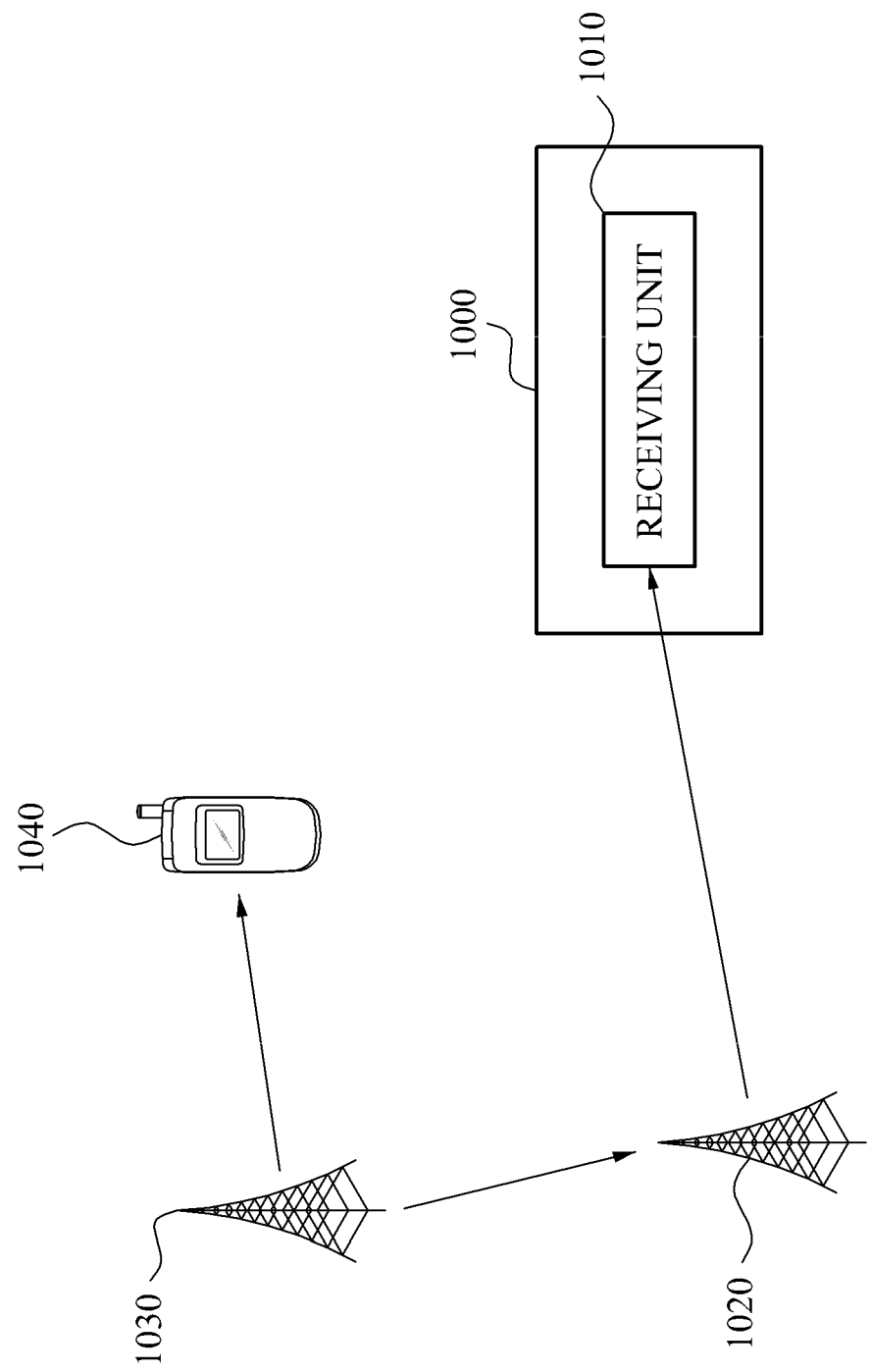
FIG. 10 is a view showing the structure of a terminal according to an embodiment.

FIG. 10 shows the structure of a terminal according to an embodiment of the present invention.

The terminal 1000 may include a receiving unit 1010.

The receiving unit 1010 may receive the first data from a relay 1020 using the second wireless resource. The relay 1020 receives the first data from a base station 1030 using the first wireless resource and forwards the first data to the terminal 1000 using the second wireless resource.

The base station 1030 transmits the second data to a second terminal 1040 using the second wireless resource.

The terminal 1000 shown in FIG. 10 receives the first data from the relay 1020 using only a part of the wireless resource of the downlink. The relay 1020 transmits the first data to the relay 1020 using other wireless resources. The base station 1030 transmits the data to the second terminal 1040 using the wireless resource used for the terminal 1000 to receive the first data. Since the wireless resource is thus reused, waste of the wireless resource is minimized and the data transmission efficiency of the data transmission system increases.

According to the embodiment, the first wireless resource or the second wireless resource may include at least one of a time slot and a frequency range.

Referring to FIG. 10, the relay receives the data of the downlink using the first wireless resource and transmits the data of the uplink using the second wireless resource. When the wireless resources allocated to the uplink and the downlink are adjacent to each other, the data transmission efficiency may reduce due to magnetic interference. Therefore, guard resources may be provided between the first wireless resource and the second wireless resource to prevent the reduction of the data transmission efficiency.

Figure 11:
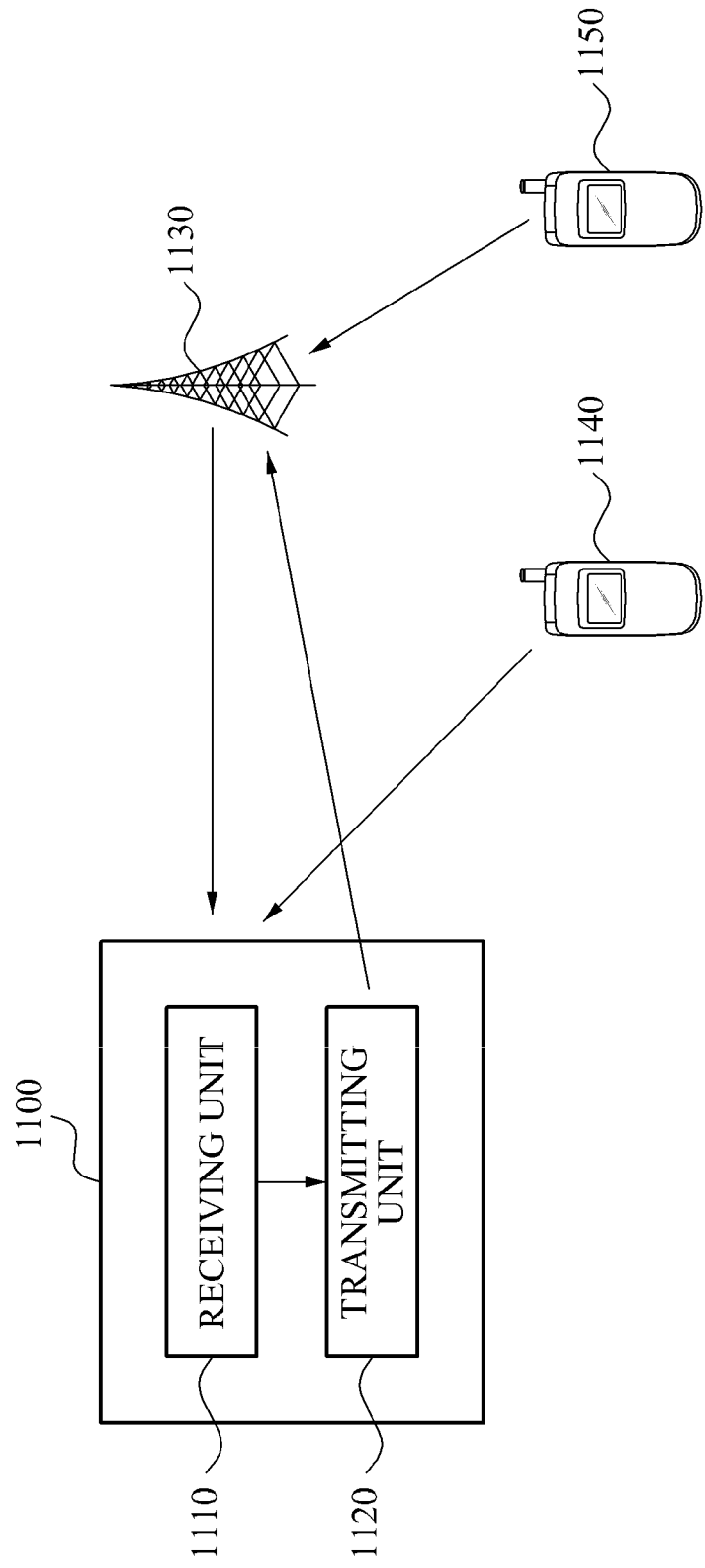
FIG. 11 is a view showing the structure of a base station according to an embodiment.

FIG. 11 shows the structure of a base station according to an embodiment.

The base station 1100 of the present embodiment includes a receiving unit 1110 and a transmitting unit 1120.

The receiving unit 1110 receives the first data from a relay 1130 using the first wireless resource and receives the second data from the first relay 1140 using the second wireless resource. The first terminal 1140 may be a macro terminal that directly connects with the base station 1100 and transmits the data to the base station 1100.

The first data received by the receiving unit 1110 from the relay 1130 may be data received by the relay 1130 from a second terminal 1150 using the second wireless resource. That is, the relay 1130 may receive the first data from the second terminal 1150 using the second wireless resource and forward the first data to the base station 1100 using the first wireless resource.

According to the embodiment, the relay 1130 may operate according to the time slot. Specifically, the relay 1130 may receive the first data from the second terminal using the second wireless resource during a first time slot and forward the first data to the base station 1100 using the first wireless resource during a second time slot. Also, the relay 1130 may receive the third data from the second terminal 1150 using the second wireless resource during the second time slot.

According to the embodiment, the first wireless resource or the second wireless resource may include at least one of a starting point of transmission of respective data, an ending point of the data transmission, and a frequency range of the data transmission. That is, the wireless resource may include information on the time slot or the frequency range.

According to the embodiment, the base station 1100 may determine the operation to be performed by the relay 1130 or the terminals 1140 and 1150 with respect to the respective wireless resources. In addition, the base station 1100 may determine ratios of the first wireless resource and the second wireless resource in the overall wireless resource.

According to the embodiment, the transmitting unit 1120 may transmit the base information on the first wireless resource and information on the second wireless resource to the relay 1130. The relay 1130 may transmit the first data to the base station 1100 based on the information on the first wireless resource and the information on the second wireless resource, and receive the third data from the second terminal 1150.

Referring to FIG. 11, the relay 1130 transmits the first data using the first wireless resource and receives the third data using the second wireless resource. In this case, the data transmission efficiency may reduce due to magnetic interference. Therefore, guard resources may be provided between the first wireless resource and the second wireless resource to prevent the reduction of the data transmission efficiency.

Figure 12:
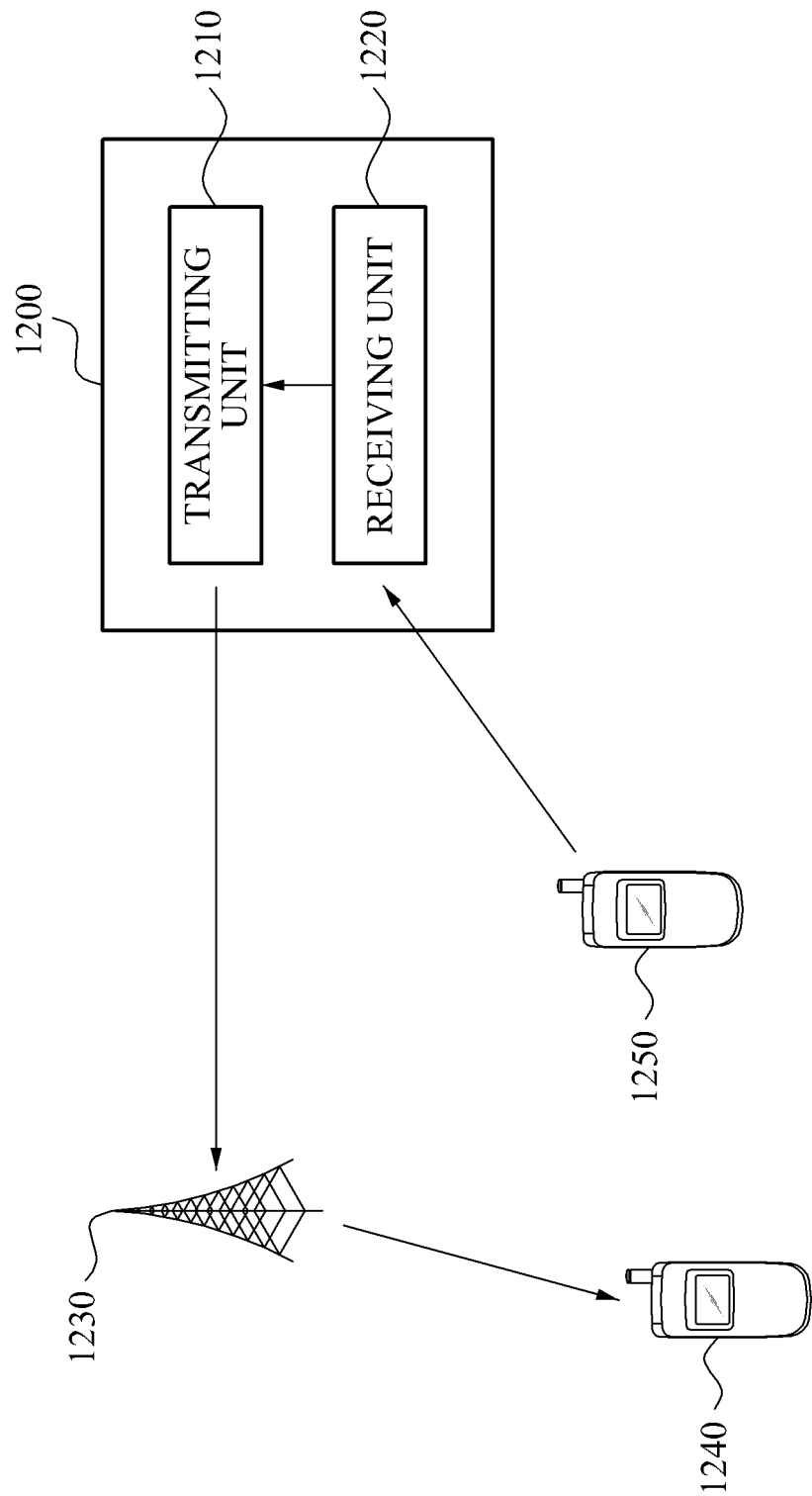
FIG. 12 is a view showing the structure of a relay according to another embodiment.

FIG. 12 shows the structure of a relay according to an embodiment of the present invention.

A relay 1200 may include a transmitting unit 1210 and a receiving unit 1220.

The transmitting unit 1210 transmits the first data to the base station 1230 using the first wireless resource.

The receiving unit 1220 receives the second data from a first terminal 1250 using the second wireless resource. The first terminal 1250 may be a relay terminal which connects with the base station 1230 via the relay 1200.

The base station 1230 receives the third data from a second terminal 1240 using the second wireless resource. The second terminal 1240 may be a macro terminal that directly connects with the base station 1230.

According to an embodiment, the first wireless resource or the second wireless resource may include at least one of a time slot and a frequency range.

The relay 1200 shown in FIG. 12 transmits the first data to the base station using only a part of the wireless resources of the uplink and receives the second data from the terminals using other wireless resources. As a result, waste of wireless resources is minimized and the data transmission efficiency of the data transmission system increases.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A relay, comprising:
 a receiving unit to receive first data from a base station using a first wireless resource and to receive second data from a second terminal; and
 a transmitting unit to transmit the second data to a first terminal using a second wireless resource and to transmit the first data to the base station,
 wherein, if the first wireless resource is receiving data or the second wireless resource is not being used by the relay, the relay allocates the first wireless resource not being used by the relay or the second wireless resource not being used by the relay to receive the data from the first terminal at the same time as the data being transmitted from the relay,
 wherein the first wireless resource and the second wireless resource are disposed in different frequency allocations (FAs) or different component carriers, and
 wherein the first data transmitted to the base station uses a different wireless resource than the second data that is received from the second terminal.

2. The relay of claim 1, wherein the second wireless resource is used for the base station to transmit third data to a second terminal.

3. The relay of claim 1, wherein the first wireless resource or the second wireless resource comprises a least one of a time slot and a frequency range.

4. The relay of claim 1, wherein the receiving unit receives information on the first wireless resource and receive the first data based on the information on the first wireless resource.

5. The relay of claim 1, wherein the receiving unit receives a reference signal from the base station and receives the first data with reference to the reference signal.

6. The relay of claim 5, further comprising:
 a channel estimation unit to estimate a channel using the reference signal,
 wherein the receiving unit receives the first data using a result of the channel estimation.

7. The relay of claim 5, wherein the receiving unit receives information on a wireless resource which transmits the reference signal from the base station and receives the reference signal based on the information on the wireless resource which transmits the reference signal.

8. The relay of claim 1, comprising a guard resource between the first wireless resource and the second wireless resource.

9. A terminal, comprising a receiving unit to receive first data received by a relay from a base station using a first wireless resource, from the relay using a second wireless resource,
 wherein if the first wireless resource is receiving data or the second wireless resource is not being used by the relay, the relay allocates the first wireless resource not being used by the relay or the second wireless resource not being used by the relay to receive the data from the first terminal at the same time as the data being transmitted from the relay, wherein the first wireless resource and the second wireless resource are disposed in different frequency allocations (FAs) or different component carriers, wherein the first data is transmitted from the relay using a different wireless resource than second data that is received by the relay, and wherein the base station transmits the second data to a second terminal using the second wireless resource.

10. The terminal of claim 9, wherein the first wireless resource and the second wireless resource comprises at least one of a time slot and a frequency range.

11. The terminal of claim 9, wherein the receiving unit receives information on the first wireless resource and information on the second wireless resource and receives the first data based on the information on the first wireless resource and the information on the second wireless resource.

12. The terminal of claim 9, comprising a guard resource between the first wireless resource and the second wireless resource.

13. A base station, comprising:
a receiving unit to receive first data from a relay using a first wireless resource and second data from a first terminal using a second wireless resource,
wherein, if the first wireless resource is receiving data or the second wireless resource is not being used by the relay, the relay allocates the first wireless resource not being used by the relay or the second wireless resource not being used by the relay to receive the data from the first terminal at the same time as the data being transmitted from the relay,
wherein the first wireless resource and the second wireless resource are disposed in different frequency allocations (FAs) or different component carriers, and
wherein the first data is transmitted from the relay using a different wireless resource than second data that is received by the relay, and
wherein the relay receives third data from a second terminal using the second wireless resource.

14. The base station of claim 13, wherein the first wireless resource and the second wireless resource comprises at least one of a time slot and a frequency range.

15. The base station of claim 13, comprising a guard resource between the first wireless resource and the second wireless resource.

16. The base station of claim 13, further comprising a transmitting unit to transmit the information on the first wireless resource and the information on the second wireless resource to the relay,
wherein the relay transmits the first data based on the information on the first wireless resource and the information on the second wireless resource.

17. A relay, comprising:
a transmitting unit to transmit first data to a base station using a first wireless resource; and
a receiving unit to receive second data from a first terminal using a second wireless resource and to receive the first data from a second terminal,
wherein, if the first wireless resource is receiving data or the second wireless resource is not being used by the relay, the relay allocates the first wireless resource not being used by the relay or the second wireless resource not being used by the relay to receive the data from the first terminal at the same time as the data being transmitted from the relay,
wherein the first wireless resource and the second wireless resource are disposed in different frequency allocations (FAs) or different component carriers, and
wherein the first data is transmitted from the relay using a different wireless resource than second data that is received by the relay.

18. The relay of claim 17, wherein the first wireless resource and the second wireless resource are disposed in different FAs or different component carriers.

19. The relay of claim 17, wherein the second wireless resource is used for the base station to receive third data from the second terminal.

20. The relay of claim 17, wherein the first wireless resource and the second wireless resource comprises at least one of a time slot and a frequency range.

* * * * *